Sept. 12, 1967     G. LESTON     3,341,607
PROCESS FOR SEPARATION OF MONO-TERTIARY-BUTYLATED CRESOLS
Filed Dec. 16, 1965
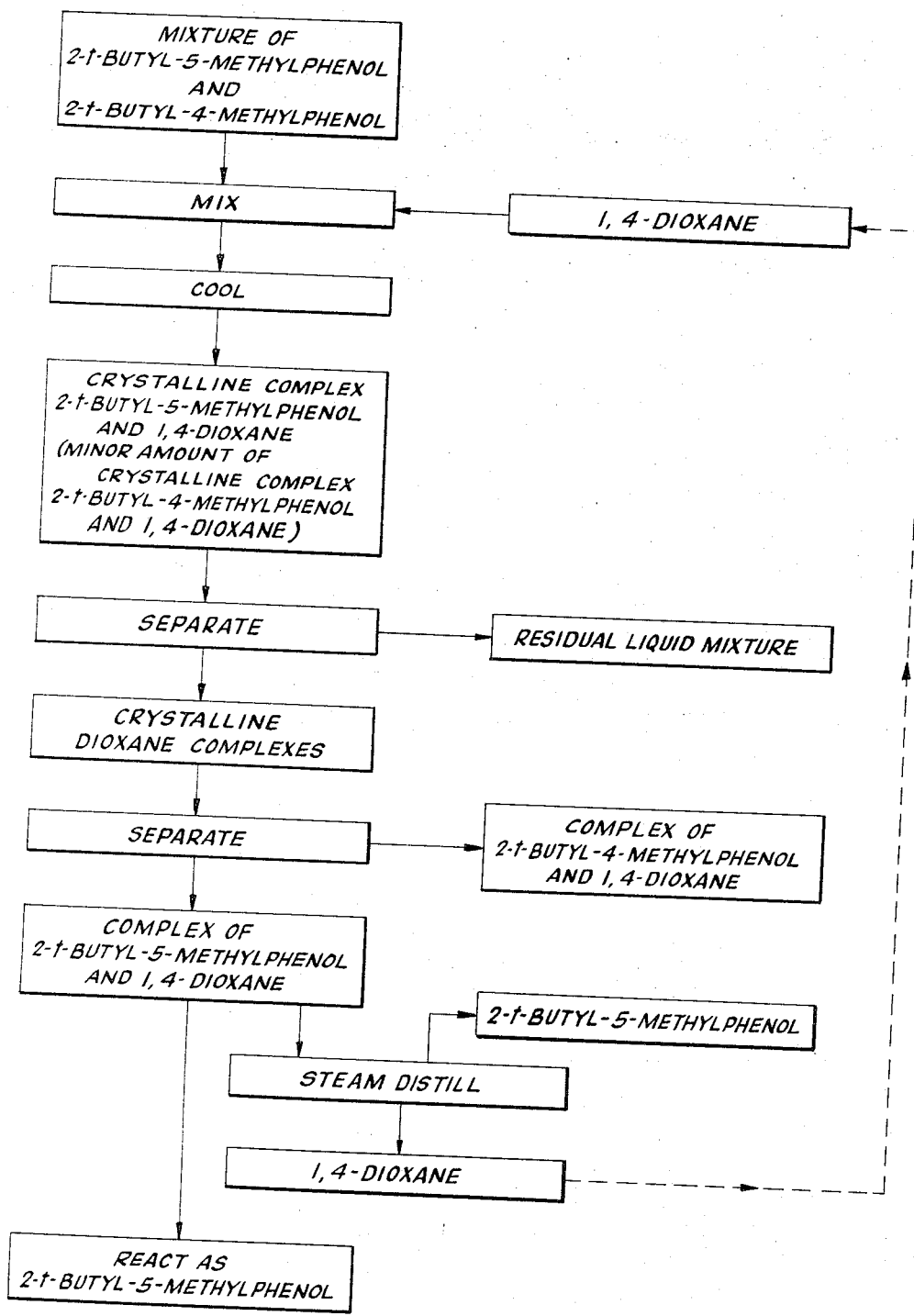
INVENTOR.
GERD LESTON
BY William G. Kratz, Jr.
his Agent 3,341,607
PROCESS FOR SEPARATION OF MONO-
TERTIARY-BUTYLATED CRESOLS
Gerd Leston, Pittsburgh, Pa., assignor to Koppers
Company, Inc., a corporation of Delaware
Filed Dec. 16, 1965, Ser. No. 514,352
5 Claims. (Cl. 260—624)

This invention relates to a novel complex, the crystal of mono-t-butylcresol-para-dioxane, and its use in the separation of isomers from mixtures containing 2-t-butyl-5-methylphenol and 2-t-butyl-4-methylphenol.

A white crystalline complex has been found to be formed from 2-t-butyl-5-methylphenol and 1,4-dioxane. The complex, having a melting point of 84° C., consists of two molecules of 2-t-butyl-5-methylphenol,

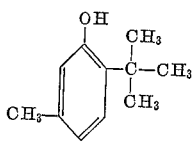

and one mole of 1,4-dioxane.

A crystalline complex also has been found to be formed from 2-t-butyl-4-methylphenol and 1,4-dioxane, consisting of nine molecules of 2-t-butyl-4-methylphenol

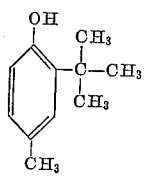

and one mole of 1,4-dioxane.

The foregoing novel compositions find utility, for example, in the separation of 2-t-butyl-5-methylphenol from mixtures of 2-t-butyl-4-methylphenol and 2-t-butyl-5-methylphenol.

The mixture of meta-, and para-cresol isomers obtained from coal tar usually contains about 60 percent meta-, and 40 percent para-cresol. Due to the close boiling point of these isomers the mixture is sold commercially instead of the separate isomers.

The butylation of the mixture of meta-, and para-cresol with isobutylene under conditions favoring mono-tertiary-butylation results in a mixture of monobutyl cresols with some dibutyl cresols and isobutylene polymers being produced. The separation of the monobutylated products (2-t-butyl-5-methylphenol and 2-t-butyl-4-methylphenol) is not practical by commercial distillation. Furthermore, a eutectic of the two monobutylated cresols arises at about the 2:1 ratio (2-t-butyl-5-methylphenol to 2-t-butyl-4-methylphenol) which would be obtained from a commercial meta-, para-cresol mixture, and precludes separation of these compounds by crystallization.

I have found that surprisingly 2-t-butyl-4-methylphenol can be readily separated from a mixture of 2-t-butyl-5-methylphenol and 2-t-butyl-4-methylphenol by the addition of 1,4-dioxane to said mixture.

Upon addition of 1,4-dioxane to a mixture of 2-t-butyl-5-methylphenol and 2-t-butyl-4-methylphenol, a solid complex is formed which precipitates from the mixture and may be readily separated therefrom. The solid which is formed comprises a complex formed from two moles of 2-t-butyl-5-methylphenol and one mole of 1,4-dioxane. A small amount of a complex of 2-t-butyl-4-methylphenol and 1,4-dioxane is also formed in a ratio of nine moles of 2-t-butyl-4-methylphenol and one mole of 1,4-dioxane.

Surprisingly, this fact does not interfere in the upgrading of 2-t-butyl-5-methylphenol from the crude mixture of the two monobutylated cresol isomers.

The solid complex which is formed from two moles of 2-t-butyl-5-methylphenol and one mole of 1,4-dioxane is readily decomposed by steam distillation into the separate compounds to yield an azeotrope of 1,4-dioxane and water as overhead while the 2-t-butyl-5-methylphenol remains as residue. The 2-t-butyl-5-methylphenol thus separated can then be debutylated to obtain pure meta-cresol.

The addition of the 1,4-dioxane to the mixture of 2-t-butyl-5-methylphenol and 2-t-butyl-4-methylphenol is preferably carried out at or slightly above room temperature. The complex formed from 2-t-butyl-5-methylphenol and 1,4-dioxane has a melting point of 83–84° C., and in this process temperatures approaching this melting point may be used with the solid complex being formed and precipitating out. Upon cooling of the mixture, further amounts of the solid complex crystallize as a white crystalline solid. As is known in the art, precipitation may be aided by seeding the mixture with a crystal of previously prepared complex or other known means.

The presence of a hydrocarbon diluent does not affect the reaction between 2-t-butyl-5-methylphenol and 1,4-dioxane in the formation of a solid complex and, in fact, has been found to be helpful. Suitable diluents would comprise the aliphatic and alicyclic hydrocarbons having up to eight carbon atoms. These diluents do not sufficiently dissolve the solid complex so as to interfere with its separation but do prevent total solidification of the mixture and prevent problems which could arise in attempting to separate the undiluted viscous unreacted constituents from the solid material.

The crystals of 2-t-butyl-5-methylphenol and 1,4-dioxane complex may be recovered by filtering, decanting or other means. The mother liquor remaining is enriched in 2-t-butyl-4-methylphenol and may be used as a source of that compound.

It is surprising to note that although 2-t-butyl-4-methylphenol also appears to form a complex with dioxane, the complex being formed in a ratio of nine moles of 2-t-butyl-4-methylphenol to one mole of 1,4-dioxane, this formation does not interfere with the upgrading of 2-t-butyl-5-methylphenol from a mixture of the two monobutylated cresols. Also, 1,4-dioxane was not found to form a solid complex when admixed with similar phenolic compounds such as meta-cresol, meta-isopropylphenol, 2,4-xylenol, or p-isopropylphenol.

The process of this invention is schematically illustrated in the accompanying drawing by flow diagram.

The invention is further illustrated in the following examples.

EXAMPLE I

To a beaker containing 1,4-dioxane there was added 2-t-butyl-5-methylphenol. A slight temperature rise was noted and a solid precipitated. The solid was separated and twice recrystallized from hexane to yield crystals having a melting point of 83–84° C. Infrared analysis of these crystals was made using a mineral oil mull. The crystals exhibited identical absorption characteristic of bonded phenolic OH, 2-t-butyl-5-methylphenol structure, and 1,4-dioxane structure consistent with a structure for a 2-t-butyl-5-methylphenol and 1,4-dioxane complex. Quantitatively, the crystals were analyzed by infrared in chloroform solution and were found to contain 67.5±1 mole percent 2-t-butyl-5-methylphenol and 32.5±1 mole percent 1,4-dioxane, characteristic of a complex comprising two moles of 2-t-butyl-5-methylphenol and one mole of 1,4-dioxane.

EXAMPLE II

To a beaker containing 1,4-dioxane was added 2-t-butyl-4-methylphenol. A solution was formed from which crystals later separated. The crystals had a melting point of 60° C. Infrared analysis of the crystals showed a dioxane-phenolic complex of 90 mole percent 2-t-butyl-4-methylphenol and 10 mole percent dioxane. This corresponds to a 9:1 mole percent complex of 2-t-butyl-4-methylphenol and 1,4-dioxane.

EXAMPLE III

A mixture of 2-t-butyl-5-methylphenol and 2-t-butyl-4-methylphenol, prepared from the monobutylation of a commercial meta-, para-cresol mixture was analyzed and found to be 63.4 percent 2-t-butyl-5-methylphenol, 35.2 percent 2-t-butyl-4-methylphenol and 1.4 percent impurities such as isobutylene low molecular weight polymers, residual cresols, etc. To 20 grams of this mixture (corresponding to 12.78 grams, 0.08 mole, of 2-t-butyl-5-methylphenol) was added at room temperature 3.40 grams (0.04 mole) of 1,4-dioxane. Upon dissolution of the 1,4-dioxane in the mixture a slight temperature rise was noted. The mixture was seeded with a few crystals of previously prepared complex of 2-t-butyl-5-methylphenol and 1,4-dioxane. The mixture warmed and a solid precipitated to form a slurry. The slurry was cooled to room temperature and filtered to give 11.5 grams of a white solid melting at 74–82.5° C. The filtrate, 10.4 grams, together with the solid amounted to a total of 21.9 grams of 94 percent recovery of the starting materials. Ten grams of the crude solid complex was recrystallized from 20 ml. of hexane. A total of 9.7 grams of complex was recovered from the recrystallization.

The recrystallized complex melted at 82.5–85° C. Vapor phase chromatographic analysis of the 11.50 grams of solid showed it to contain 2.59 grams of 1,4-dioxane, 8.33 grams of 2-t-butyl-5-methylphenol and only a minor amount (0.58 gram) of 2-t-butyl-4-methylphenol. The 2-t-butyl-5-methylphenol recovered amounted to 66 percent of that present in the original mixture.

EXAMPLE IV

At room temperature, 328 grams (2 moles) of 2-t-butyl-5-methylphenol and 88 grams (1 mole) of 1,4-dioxane were mixed in a beaker. The mixture became hot and solidified. About 500–700 milliliters of hexane was added and the slurry was stirred and filtered. The solid complex was washed with hexane and allowed to dry in air to yield 380 grams of solid material, corresponding to a 91.5 percent yield of a complex comprising 2 moles of 2-t-butyl-5-methylphenol and 1 mole of 1,4-dioxane.

EXAMPLE V

A 49.5 gram sample of solid complex produced in Example III (78.85 percent 2-t-butyl-5-methylphenol and 21.15 percent 1,4-dioxane) and 200 milliliters of distilled water were placed in a flask. Using a one foot glass helix packed column, this mixture was distilled at atmospheric pressure. The initial boiling point of the distillate was 87° C. but was difficult to maintain at this lower temperature except at very high reflux ratio. The temperature of the distillate slowly rose to 100° C. as 12.0 milliliters, 12.3 grams was distilled. The distillate was analyzed by vapor phase chromatograph analysis and showed 72.5 percent 1,4-dioxane which corresponds to 8.92 grams or 85 percent of a dioxane in the solid complex starting material. There was no 2-t-butyl-5-methylphenol found in the distillate. The residue in the distillation flask consisted of two layers, an oily upper layer and a lower aqueous layer. The oily layer was separated and weighed to give 36.8 grams of material which was analyzed and found to be 96.0 percent 2-t-butyl-5-methylphenol. The impurities in the 2-t-butyl-5-methylphenol oily layer comprised 0.25 percent dioxane and 3.75 percent water. This recovery amounts to 90 percent of the 2-t-butyl-5-methylphenol in the complex starting material.

EXAMPLE VI

To a 3-neck, 500 milliliter flask equipped with a dropping funnel, mechanical stirrer, thermometer and reflux condenser there was charged 52.0 grams of complex of 2-t-butyl-5-methylphenol and 1,4-dioxane (corresponding to 41 grams of 2-t-butyl-5-methylphenol). To this was added 32 milliliters of methanol and 10.5 grams of concentrated hydrochloric acid. To this was added 9.9 grams n-butyraldehyde (0.14 mole) at a dropwise rate over a 45 minute period at a temperature of 35–40° C. The mixture was refluxed (82–77° C.) for a period of three hours. It was then transferred to a 600 milliliter beaker and 250 milliliters of water and 250 milliliters of n-hexane were added. On cooling, a solid precipitated which was filtered.

The solid weighed 33.7 grams. The solid melted at 207–210.8° C. and corresponds to a 70.6 percent yield of 4,4'-butylidenebis(2-t-butyl-5-methylphenol) based on the 2-t-butyl-5-methylphenol present in the complex starting material. The melting point of 4,4'-butylidene bis(2-t-butyl-5-methylphenol) reported by D. J. Beaver et al., Journal of the Amer. Chem. Soc., 74, p. 3410 (1952) is 210–210.7° C.

I claim:
1. The complex consisting of two molecules of 2-t-butyl-5-methylphenol and one molecule of 1,4-dioxane.
2. The complex consisting of nine molecules of 2-t-butyl-4-methylphenol and one molecule of 1,4-dioxane.
3. Process for separating 2-t-butyl-5-methylphenol from a mixture of 2-t-butyl-5-methylphenol and 2-t-butyl-4-methylphenol comprising:
  adding 1,4-dioxane to said mixture to form a solid complex comprised mainly of 2-t-butyl-5-methylphenol and 1,4-dioxane,
  separating said solid complex from said mixture,
  decomposing said solid complex to give 2-t-butyl-5-methylphenol and 1,4-dioxane, and
  recovering substantially pure 2-t-butyl-5-methylphenol therefrom.
4. The process of claim 3 in which said complex is decomposed by distilling said complex in the presence of water.
5. The process of claim 3 wherein a hydrocarbon solvent selected from the group consisting of aliphatic and alicyclic hydrocarbons having up to eight carbon atoms is present with said mixture of 2-t-butyl-4-methylphenol and 2-t-butyl-5-methylphenol.

References Cited

UNITED STATES PATENTS 2,863,927   12/1958   Parisse ------------- 260—624

LEON ZITVER, Primary Examiner.

H. ROBERTS, Assistant Examiner.